US012611627B2

(12) United States Patent
Zuberbuehler et al.

(10) Patent No.: US 12,611,627 B2
(45) Date of Patent: Apr. 28, 2026

(54) METHOD FOR CONTINUOUSLY OBTAINING CARBON DIOXIDE AND DEVICE FOR CARRYING OUT THIS METHOD

(71) Applicant: ZENTRUM FÜR SONNENENERGIE—UND WASSERSTOFF-FORSCHUNG BADEN-WÜRTTEMBERG GEMEINNÜTZIGE STIFTUNG, Stuttgart (DE)

(72) Inventors: Ulrich Zuberbuehler, Stuttgart (DE); Sebastian Thaler, Waiblingen (DE); Bastian Feigl, Stuttgart (DE); Bernd Stuermer, Holzgerlingen (DE); Frank Baumgart, Stuttgart (DE)

(73) Assignee: ZENTRUM FÜR SONNENENERGIE—UND WASSERSTOFF-FORSCHUNG BADEN-WÜRTTEMBERG GEMEINNÜTZIGE STIFTUNG (DE)

( * ) Notice: Subject to any disclaimer, the term of this patent is extended or adjusted under 35 U.S.C. 154(b) by 210 days.

(21) Appl. No.: 18/251,691

(22) PCT Filed: Nov. 4, 2021

(86) PCT No.: PCT/EP2021/080630
§ 371 (c)(1),
(2) Date: May 3, 2023

(87) PCT Pub. No.: WO2022/096568
PCT Pub. Date: May 12, 2022

(65) Prior Publication Data
US 2023/0405513 A1 Dec. 21, 2023

(30) Foreign Application Priority Data
Nov. 4, 2020 (DE) ..................... 10 2020 128 989.8

(51) Int. Cl.
*B01D 53/04* (2006.01)
*B01D 53/14* (2006.01)
*B01D 53/18* (2006.01)

(52) U.S. Cl.
CPC ......... *B01D 53/0462* (2013.01); *B01D 53/04* (2013.01); *B01D 53/1493* (2013.01);
(Continued)

(58) Field of Classification Search
CPC .......................... B01D 53/04; B01D 53/0462; B01D 53/1493; B01D 53/18
See application file for complete search history.

(56) References Cited

U.S. PATENT DOCUMENTS 3,498,026 A * 3/1970 Daly ...................... B01D 53/02
95/107
2008/0293976 A1 11/2008 Olah et al.
(Continued)

FOREIGN PATENT DOCUMENTS

CA 3126872 A1 7/2020
CN 110496493 A * 11/2019 ............. C01B 32/50
(Continued)

OTHER PUBLICATIONS

International Search Report and Written Opinion of International Application No. PCT/EP2021/080630.
(Continued)

*Primary Examiner* — Robert A Hopkins
(74) *Attorney, Agent, or Firm* — LEYDIG, VOIT & MAYER, LTD.

(57) ABSTRACT

The present invention relates to a method for continuously obtaining carbon dioxide from a carbon-dioxide containing atmosphere, in which a fibrous carrier material charged with polyethylene imine is guided alternately through at least one adsorption zone and at least one desorption zone. In addi-
(Continued)

tion, the present invention relates to a device by which the method according to the invention can be carried out.

19 Claims, 5 Drawing Sheets

(52) U.S. Cl.
CPC .......... *B01D 53/18* (2013.01); *B01D 2253/25* (2013.01); *B01D 2257/504* (2013.01)

(56) References Cited

U.S. PATENT DOCUMENTS

| | | |
|---|---|---|
| 2012/0076711 A1 | 3/2012 | Gebald et al. |
| 2014/0331864 A1 | 11/2014 | Tomoyuki et al. |
| 2017/0239617 A1 | 8/2017 | Eisenberger |

FOREIGN PATENT DOCUMENTS

| | | |
|---|---|---|
| DE | 4235125 A1 | 4/1994 |
| JP | H11244652 A | 9/1999 |

OTHER PUBLICATIONS

Zuberbuehler, Ulrich (2018) "CO2-Rohstoff aus Luft: Entwicklung eines hoch effizienten Verfahrens zur CO 2—Bereistellung aus Luft als Basis fur die Erzeugung regenerativer Rohstoffe", Status conference, Apr. 17/18, 2018, CO2Plus—joint project CORAL, FKZ 033RC005A, pp. 1-16.
Office Action for corresponding German application No. 10 2020 128 989.8, issued Jun. 8, 2021, 8 pages.
Decision to Grant for corresponding German application No. 10 2020 128 989.8, issued Aug. 26, 2024m 10 pages.

* cited by examiner

METHOD FOR CONTINUOUSLY OBTAINING CARBON DIOXIDE AND DEVICE FOR CARRYING OUT THIS METHOD

CROSS-REFERENCE TO RELATED APPLICATIONS

This application is a U.S. National Stage Application filed under 35 U.S.C. § 371 of International Application No. PCT/EP2021/080630, filed Nov. 4, 2021, which claims the benefit of German Patent Application No. 10 2020 128 989.8, filed Nov. 4, 2020. Both of these applications are hereby incorporated by reference in their entireties.

FIELD OF THE INVENTION

The present invention relates to a method for continuously obtaining carbon dioxide from a carbon-dioxide containing atmosphere, in which a fibrous carrier material charged with polyethylene imine is guided alternately through at least one adsorption zone and at least one desorption zone. The present invention also relates to a device by which the method according to the invention can be carried out.

TECHNICAL BACKGROUND AND PRIOR ART

Carbon dioxide ($CO_2$) occurs in large quantities as a waste product when burning fossil fuels or biomass. As a greenhouse gas, it demonstrably contributes to global warming and, if the global temperature increase is to be limited to +1.5° C., it must be separated, sequestered or bound in products for as long as possible.

Various approaches to $CO_2$ reduction and sustainable use have already been developed. One of the approaches deals with methods for obtaining $CO_2$ from a carbon-dioxide containing atmosphere and the subsequent use of the obtained $CO_2$ as a raw material for the production of materials and energy carriers. The previously known possible technical implementations of this approach have certain commonalities but there are also some differences.

The methods for obtaining $CO_2$ from a carbon-dioxide containing atmosphere provide a common step in which $CO_2$ is adsorbed or absorbed by a sorbent under sorption conditions. Furthermore, the methods include a step in which the $CO_2$ is desorbed under desorption conditions, thereby obtaining a $CO_2$-enriched gas or pure $CO_2$. In addition, most known methods use a conveying device, such as a fan, with which a stream of carbon-dioxide containing atmosphere can be circulated or conveyed in a controlled manner, by means of which fan at least one convection or circulation of the carbon-dioxide containing atmosphere can be brought about.

However, a first difference consists in the type of sorbent used: the sorbent used can be a washing lye or an amine-containing washing liquid. It is also possible that the sorbents used are solid-bound amines. Solid-bound sorbents are currently usually bound to highly porous carrier material such as silicon dioxide, metal-organic framework (MOF) and zeolite or they applied to a membrane. The amines used are amine-functionalized compounds or low molecular weight amines, such as monoethanolamine (MEA), diethanolamine (DEA), diisopropanolamine (DIPA), methyldiethanolamine (MDEA) and 2-amino-2-methyl-1-propanol (AMP) or high molecular weight amines, such as polyethylene imine.

In addition, the methods differ in the specific implementation of the sorption and desorption step. The washing lyes or liquids can be charged in batch mode with $CO_2$ and subsequently subjected to desorption. Alternatively, the washing lyes or liquids can also be conveyed alternately through an absorber and a desorber, so that continuous operation is possible in the method. In the case of solid-bound sorbents, on the other hand, the so-called pressure and/or temperature swing adsorption (PSA/TSA) operation is widespread. In this case, the sorbent is placed in a container at the beginning of the method. The sorption and desorption steps are then carried out one after the other, namely in two separate cycles. In this case, the provision of several sorbent-charged containers and their parallel operation enable a quasi-continuous operation.

An example of a method for obtaining $CO_2$ from a carbon-dioxide containing atmosphere is described in DE 4235125 A1. In this case, a gas mixture containing $CO_2$ is passed through an absorber with caustic potash. Carbon dioxide is absorbed to form potassium carbonate. The liquid containing potassium carbonate is then passed through a neutralizer into which sulfuric acid is introduced. This leads to the neutralization of the liquid with the formation of potassium sulfate and the outgassing of $CO_2$. Potassium sulfate is then converted back into KOH and sulfuric acid in an electrodialysis unit. Although the $CO_2$ obtained in this method has high purity, it also involves high energy consumption.

It must also be considered hat scrubber systems for extracting $CO_2$, such as the one described in DE 4235125 A1, can only be economically scaled up to a production of 100 $kg_{CO2}$/h. For larger production volumes, modular scaling is recommended, with several medium-capacity units running in parallel.

US 2008/293976 A1 discloses a solid sorbent for absorbing $CO_2$, a method for producing the sorbent and a method for obtaining $CO_2$ from a carbon-dioxide containing atmosphere, in which the sorbent is used. In this case, the solid sorbent comprises a low molecular weight amine and a nano-structured solid carrier. The porous carrier material is from the group consisting of nanosilica, silica-alumina, calcium silicate, and carbon nanotubes. The method for recovering $CO_2$ is outlined only rudimentarily and involves exposing the sorbent to the carbon-containing atmosphere to cause the sorption of $CO_2$ through the sorbent and then processing the sorbent to release the sorbed $CO_2$. This batch-type operation is disadvantageous, however, since it does not allow a gas stream enriched with $CO_2$ to be drawn off continuously. Carbon dioxide only occurs during the desorption cycle.

US 2012/076711 A1 describes a method for obtaining $CO_2$ in which a solid-bound sorbent is also used. The sorbent can be a polyethylene imine-based and/or tetraethylene pentamine-based sorbent. The sorbent is covalently bonded to fibers of carbon, polyacrylonitrile, rayon, lignin, cellulose, lyocell, polylactic acid, chitosan, polyvinyl alcohol, polyethylene terephthalate, polyacrylic acid, polyvinylamine, or a mixture thereof. In one embodiment of the method, the composite of sorbent and fibers is in the form of fiber mats that are arranged parallel to one another. In order to reduce the duration of an adsorption/desorption cycle, the spacing between the fiber mats during the desorption step is reduced compared to the spacing during the absorption step. This is intended to promote heat exchange between the fiber mats during desorption. In addition, it is proposed to place the units of solid-bound sorbent into vacuum bags which can be connected to a vacuum generating device during the desorption process. Despite these efficiency-enhancing measures, the batch-like operation of the method, in which only one step (adsorption or desorption) takes place at a time, is unsatisfactory.

OBJECT OF THE INVENTION

The object of the present invention is to overcome the disadvantages known from the prior art. A goal of the present invention was to specify a method that makes it possible to obtain $CO_2$ from a carbon-dioxide containing atmosphere in a particularly energy-efficient manner. A further goal was to provide a device by which the method can be carried out. In addition, the method and device should be able to be scaled to a climate-relevant scale.

SUMMARY OF THE INVENTION

These objects are achieved by the method according to the invention and the device according to the invention, each having the features of the independent claims.

The present invention relates to a method for continuously obtaining carbon dioxide from an carbon-dioxide containing atmosphere, in which a fibrous carrier material charged with polyethylene imine is passed alternately through at least one adsorption zone and at least one desorption zone. The carrier material absorbs carbon dioxide from the carbon dioxide-containing atmosphere at room temperature and normal pressure in the at least one adsorption zone and releases it in the at least one desorption zone at a temperature that is higher than room temperature and/or at a carbon dioxide partial pressure that is lower than normal conditions.

The method of the invention has the advantage that it can be performed continuously. Due to the spatially separate adsorption zone and desorption zone, no separate cycles for $CO_2$ charging and $CO_2$ release are necessary. In addition, the method is characterized by low overall energy consumption. The maximum amount of electrical energy required to provide 1 kg of $CO_2$ is 0.5 $kWh_{el}$. The thermal energy required for desorption is also low, estimated to be at least 0.5 $kWh_{th}/kg_{CO2}$, since solid-associated polyethylene imine undergoes $CO_2$ adsorption (instead of $CO_2$ absorption that occurs with PEI washing solutions). Accordingly, the thermal energy required for desorption can easily be covered by waste heat from other processes.

Apart from that, it has also been found that high-molecular, branched PEI is particularly suitable as a sorbent for the method, since it has a very low vapor pressure. Losses of PEI in the production of the carrier material are therefore not to be expected. The risk of PEI detaching from the carrier material and evaporating is also low when the method according to the invention is carried out. In addition, PEI has a large number of NH groups and thus a high concentration of possible adsorption sites (amine efficiency). These factors also contribute to a further improvement in the ecological balance of the method.

The fact that the fibrous carrier material charged with polyethylene imine is "guided" through different zones means that it is moved back and forth and/or circulated in a controlled manner by a device. A movement that is only triggered by an uncontrolled shock or by uncontrolled vibration does not fall under this definition. In addition, the carrier material must be guided "alternately" through at least one adsorption zone and at least one desorption zone. A method in which the carrier material is only moved back and forth or circulated within a single zone does not fall under this definition.

In the context of the present invention, "adsorption zone" and "desorption zone" denote regions which are spatially separated from one another. The exchange of matter and heat between the desorption zone and the environment is preferably limited, while an exchange of matter and heat between the adsorption zone and the environment is preferably unrestricted.

"Room temperature" is preferably the temperature that is present at the location where the method is carried out due to seasonality, insulation and any heat sources and/or air conditioning devices that may be present. The room temperature can range from −20 to +50° C. The room temperature is preferably in the range from +10 to +40° C.

In the context of the present invention, the term "normal pressure" is intended to designate the air pressure that is present at the location at which the method is carried out. At sea level, for example, normal pressure is 101325 Pa or about 1 bar. At 1000 m above sea level, normal pressure corresponds to 89120 Pa or 0.89 bar. A normal pressure within the meaning of the present invention can therefore also be estimated using the barometric altitude formula.

The concept of "carbon dioxide partial pressure reduced compared to normal conditions" is also based on the concept of normal pressure. Under normal conditions, the carbon dioxide partial pressure of air at sea level is 0.4 mbar. This corresponds to 0.04% of 1 bar or 400 ppm, wherein 0.04% is the volume fraction of $CO_2$ in air. The carbon dioxide partial pressure of air is correspondingly lower at 1000 m above sea level.

In a particularly preferred embodiment of the method, the carbon-dioxide containing atmosphere comprises or consists of air. The term air is understood to mean ambient air, exhaust air, including industrial exhaust air and/or exhaust gases. Preferably, the carbon dioxide-containing atmosphere in the adsorption zone is continuously renewed. This means that low carbon dioxide air in the adsorption zone is gradually exchanged for carbon dioxide-rich air by natural convection and diffusion. In other words, this means that untreated air is continuously fed into the adsorption zone, in particular by natural convection.

The carbon-dioxide containing atmosphere is in particular air which has a relative humidity of at least 20%. In this way, the carrier material in the at least one adsorption zone can absorb or adsorb not only $CO_2$ but also water from the carbon-dioxide containing atmosphere.

This is because $CO_2$ and water are preferably obtained simultaneously with the method according to the invention. With the method according to the invention, at least 1 kg of $CO_2$ and 1.6 kg of water can preferably be produced in this way with an electrical energy consumption of at most 0.5 $kWh_{el}$.

In a preferred embodiment of the method, the at least one desorption zone is heated to a temperature of more than 30° C., at least in portions. The at least one desorption zone is particularly preferably heated at least in portions to a temperature of more than 70° C., very particularly preferably more than 90° C., in particular more than 100° C. Such a temperature increase is one way of reducing the carbon dioxide partial pressure in the desorption zone compared to normal conditions and thus accelerating the release of $CO_2$ adsorbed on the carrier material. At the same time, desorption of any water adsorbed on the carrier material is also promoted.

In a further variant, the reduced carbon dioxide partial pressure in the at least one desorption zone is achieved by reducing the absolute pressure to a maximum of 0.70 bar (700 mbar), particularly preferably to a maximum of 0.50 bar (500 mbar), very particularly preferably 0.09 to 0.25 bar (90 to 250 mbar), or by supplying a stripping gas or by a combination above said measures. A stripping gas within the meaning of the present invention is a low-$CO_2$ gas, preferably a gas containing less than 0.001% $CO_2$. It is particularly preferred that the stripping gas also contains only small proportions of nitrogen, in particular less than 0.005% $N_2$, since $N_2$ can be separated from $CO_2$ again only with great effort. For example, a gas which contains more than 95% by weight, preferably more than 99% by weight, of $H_2O$ or $H_2$ can be used as the stripping gas.

Reducing the absolute pressure in the at least one desorption zone has the advantage that the desorbed $CO_2$ can be obtained in pure form or as a mixture with steam. The consequence of supplying the stripping gas is that a gas mixture of $CO_2$ and the stripping gas is produced, while consuming a low amount of energy, which can therefore be useful.

An excessive reduction in the absolute pressure (namely to a pressure of less than 90 mbar) is not intended in the method according to the invention. This ensures that the method can be easily scaled up to climate-influencing scale.

The desorption of $CO_2$ and optionally of adsorbed water is preferably performed by a mix of different desorption measures, namely by increasing the temperature and reducing the absolute pressure or by increasing the temperature and supplying stripping gas. These desorption measures can be carried out simultaneously or sequentially.

The at least one desorption zone preferably comprises several portions at different temperatures. The at least one desorption zone preferably comprises at least two portions at different temperatures. Different temperatures can be present, for example, when the temperatures differ by at least preferably by at least 20° C. A first portion of the at least one desorption zone preferably is at room temperature and has an absolute pressure of 0.09 bar (90 to 250 mbar). Another (second and/or last, for example) portion of the at least one desorption zone is preferably heated to a temperature of 90 to 110° C., in particular 95 to 110° C., and has an absolute pressure of 0.09 to 0.15 bar (90 to 150 mbar).

The portion-wise temperature control and pressure reduction or adjustment to normal pressure allows a gradual separation of various components from the carrier material. At the conditions in the first portion (reduced pressure), mainly unsaturated humid air is separated. The unsaturated humid air can be removed from the first portion by means of a first extraction. Under the conditions in the second portion, in which additional heating takes place, the water adsorbed in the adsorption zone is almost completely removed from the carrier material. An atmosphere of water vapor and residual air is created in the second portion. This gas can be removed by means of a second extraction and the water vapor contained can be condensed. The water and the condensation heat can be used in further process steps.

The at least one desorption zone preferably comprises at least three portions at different temperatures. A first portion preferably is at room temperature and has an absolute pressure of 0.90 to 0.25 bar (90 to 250 mbar). A second portion is preferably heated to a temperature of 45 to 85° C. and has an absolute pressure of 0.90 to 0.25 bar (90 to 250 mbar). A final portion is preferably heated to a temperature of 95 to 110° C. and has an absolute pressure of 0.9 bar to 0.15 bar (90 mbar to 150 mbar). It is also possible for the desorption zone to comprise four portions, wherein the conditions prevailing in the first three portions are as described above and the fourth portion is used for controlling the temperature of the carrier material (such as cooling to room temperature).

In a further variant of the method, the fibrous carrier material charged with polyethylene imine is present as a circulating fabric belt (endless belt) or as a circulating non-woven fabric (endless non-woven fabric). In this case, it is preferred if the carrier material is continuously guided in a circulation through at least one adsorption zone and at least one desorption zone. The circulation speed of the carrier material is set in such a way that the carrier material is at least approximately saturated with $CO_2$ in the last portion of the adsorption zone and is at least approximately completely regenerated in the last portion of the desorption zone. A belt circulation speed of 0.05 to 0.5 m/s, in particular 0.1 m/s, is suitable for this purpose.

The invention also relates to a device for continuously obtaining carbon dioxide from a carbon dioxide-containing atmosphere, by which the method described above can be carried out. The device comprises a fibrous carrier material charged with polyethylene imine, an adsorption zone and a desorption zone. The desorption zone comprises at least one heating device and/or at least one device for pressure reduction and/or a stripping gas feed. In addition, the fibrous carrier material charged with polyethylene imine is movably stretched over a number of support and/or deflection rollers that are arranged in the adsorption zone and/or in the desorption zone.

The adsorption zone is preferably a thermodynamically open system, particularly preferably an open space that allows an unconstrained exchange of heat and material with the environment.

The desorption zone is preferably a system that is not designed to be completely gas-tight and only allows a limited material and heat exchange with the environment. This means that the desorption zone is located, for example, in a container with an inlet and outlet for the carrier material which are not completely sealed from the ambient air.

A free material and heat exchange, but also an unhindered pressure equalization between the desorption zone and the ambient air is preferably avoided by dimensioning the cross section of the openings, which serve as inlet or outlet for the carrier material in the desorption zone, in a way that it is small compared to the area of the desorption zone. Furthermore, a minimum extension (length) of the desorption zone between inlet and outlet is preferably provided. It is preferred if the cross section of the openings at the inlet and outlet of the desorption zone is at most 5%, particularly preferably at most 2.5% of the area (length of the desorption zone times width of the carrier material) of the desorption zone. It is also preferred if the desorption zone has a minimum extent (length) which corresponds to twice the width of the carrier material.

In a further embodiment, the desorption zone has at least two spatially separate gas outlets which are each connected to a suction device. These gas outlets are used to separate the target components $CO_2$ and $H_2O$. In addition, the device can be connected via these gas outlets to systems of downstream located method steps.

Furthermore, it is possible for various installations and/or partition walls to be present in the desorption zone. These installations and/or partition walls preferably serve to compartmentalize the desorption zone into different portions and are intended to limit the material and energy exchange between the portions.

As already described above, the fibrous carrier material comprises a non-woven or a woven fabric or consists of a non-woven or a woven fabric, in particular a circulating non-woven fabric or a circulating woven fabric belt. non-woven and woven fabrics are particularly suitable for use in the present device because of their low density of 250 to 450 g/m², They can be circulated on rollers or conveyed back and forth without considerable effort or energy.

The fibrous carrier material in the device according to the invention can preferably absorb 70 to 700 mg of carbon dioxide per 1 g of polyethylene imine. In particular, the absorption capacity of the carrier material is 200 to 600 mg of carbon dioxide per 1 g of polyethylene imine. In the event that the carrier material is made of a woven web and/or non-woven fabric with a density of 250 to 450 g/m², this preferably corresponds to a $CO_2$ absorption of about 20 g per 1 m 2 carrier material. This can be achieved by charging the carrier material with polyethylene imine in such a way that as many amine groups as possible are accessible to $CO_2$ and the bound polyethylene imine has no crystalline structures. In addition, if possible, it should be ensured that the poly-ethylene imine is bound so strongly to the carrier material that it is not dissolved and washed out on contact with water (such as rain).

For example, the fibrous carrier material charged with polyethylene imine is a cellulose non-woven or woven fabric charged with PEI. This can be obtained, for example, by impregnation with PEI. Another way to fix PEI is to "cross-link" the liquid PEI solution after it has penetrated the carrier material. In this case, PEI molecules can be fixed both to one another and to the carrier material by using a "cross-linking agent". The polyethylene imine content of the charged carrier material is preferably about 10% by weight.

Furthermore, it is preferred that the polyethylene imine is a branched polyethylene imine and has a number-average molecular weight Mn of 25,000 to 100,000 g/mol, particu-larly preferably 60,000 to 100,000 g/mol.

An advantageous use results when the method described above is combined with a method for hydrocarbon synthesis, preferably for methane production. Accordingly, the use of the device described above in combination with a device for hydrocarbon synthesis, such as for methane production, is preferred. This use allows the sustainable production of fuels (e-fuels).

In addition, the method according to the invention and device according to the invention can be used in closed air circuits. In this case, the air treatment in aircraft and space-crafts, submarines and buildings should be mentioned, among other things. Another large consumer of $CO_2$ pro-duced with the present method is the food industry, which needs this raw material for the production of carbonated beverages or as an extraction agent.

DESCRIPTION OF THE PREFERRED EMBODIMENTS

Preferred embodiments of the invention are explained in more detail with reference to the following figures and experiments, without limiting the invention thereto.

Figure 1:
FIG. 1 shows a method and a device for obtaining $CO_2$ according to the prior art.
Figure 1:
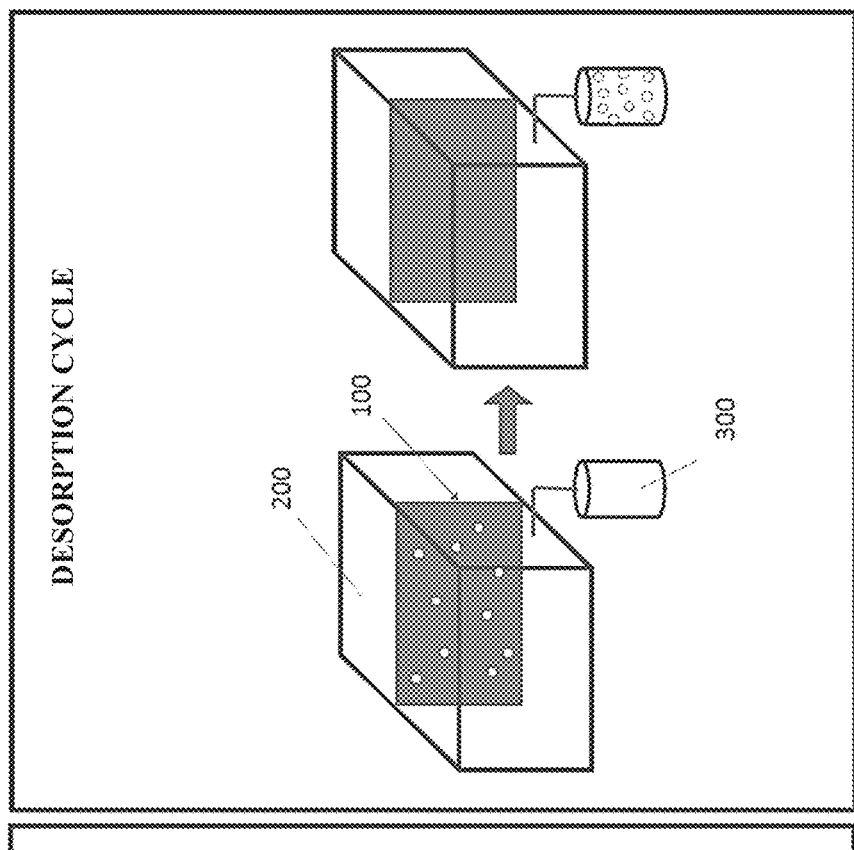
Figure 1:
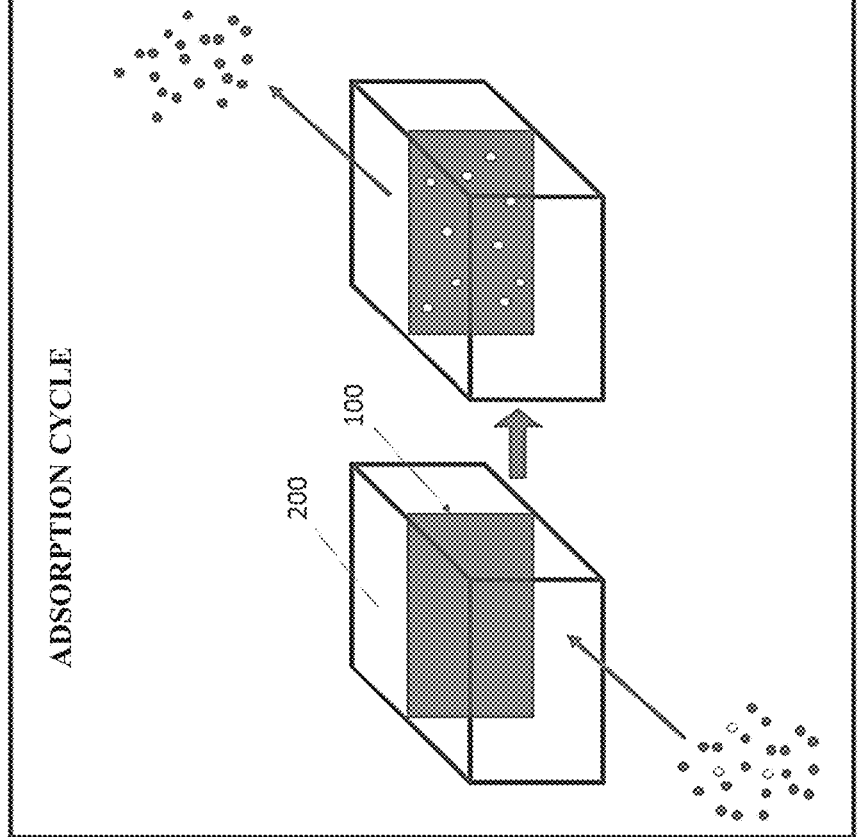

The device for obtaining $CO_2$ according to the prior art, which is outlined in FIG. 1, comprises a carrier material 100, which is charged with amines and which is installed in a sort of air filter 200. The device allows only a discontinuous process. In a first cycle ("adsorption cycle") the carrier material is charged with $CO_2$. In a second cycle ("desorption cycle"), $CO_2$ is released and fed into a storage device 300.

Figure 2:
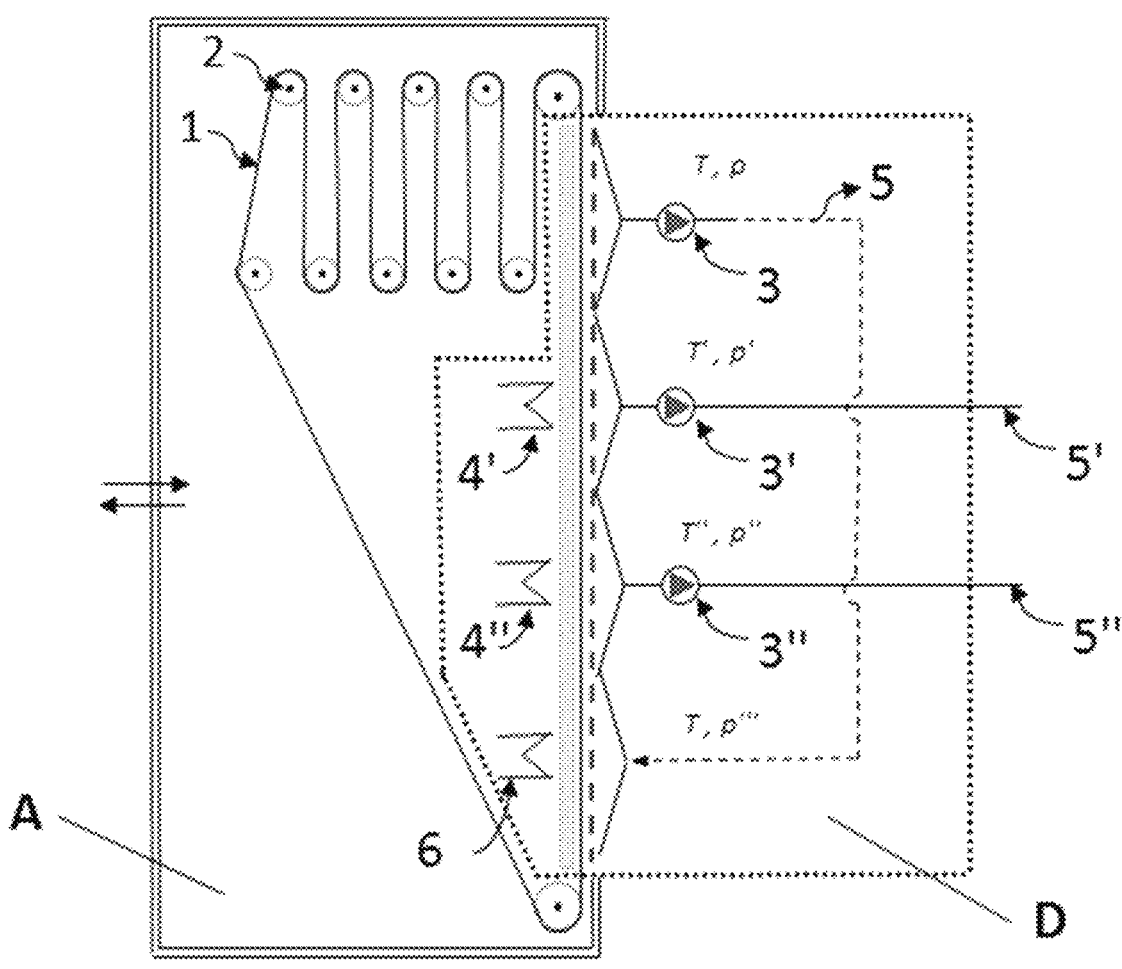
FIG. 2 shows an embodiment variant of the method according to the invention and of the device according to the invention.

In contrast, the device according to the invention, which is shown in FIG. 2, allows a continuous process. The carrier material charged with polyethylene imine is present in this case in the form of a circulating fabric belt 1. The circulating fabric belt 1 is tensioned over a plurality of support and/or deflection rollers 2 and can be guided through these alter-nately through an adsorption zone A and a desorption zone D. The adsorption zone is a system that is not thermody-namically closed and allows a material exchange with the environment. The desorption zone D is also a zone that is not designed to be completely gas-tight. In the schematic figure, the desorption zone has a housing, for example, into which the fabric belt 1 is introduced, in order then to pass through several portions. In the first three portions of the desorption zone there are gas exhausts connected to pressure reduction devices 3, 3' or 3". Each of the gas vents has a gas outlet 5, 5' or 5". The second and third portions comprise heaters 4' and 4". In the first portion of the desorption zone, mainly air is drawn at a temperature T and a pressure p via the gas outlet 5. The drawn air is, for example, supplied, as shown, to the fourth portion of the desorption zone and used to recondition the carrier material 1 for the adsorption zone A. In the second and third portions of the desorption zone, $CO_2$ or water is removed from the carrier material at temperatures T' or T" and pressures p' or p" and exits the desorption zone as a $CO_2$-rich gas mixture or as saturated water vapor via the gas outlets 5' and 5". A heat exchanger 6 can be connected to the fourth portion of the desorption zone, which is provided for conditioning the carrier material, which heat exchanger absorbs the heat given off by the carrier material 1 so that it can be utilized for heat integration in steps of other processes.

Figure 3:
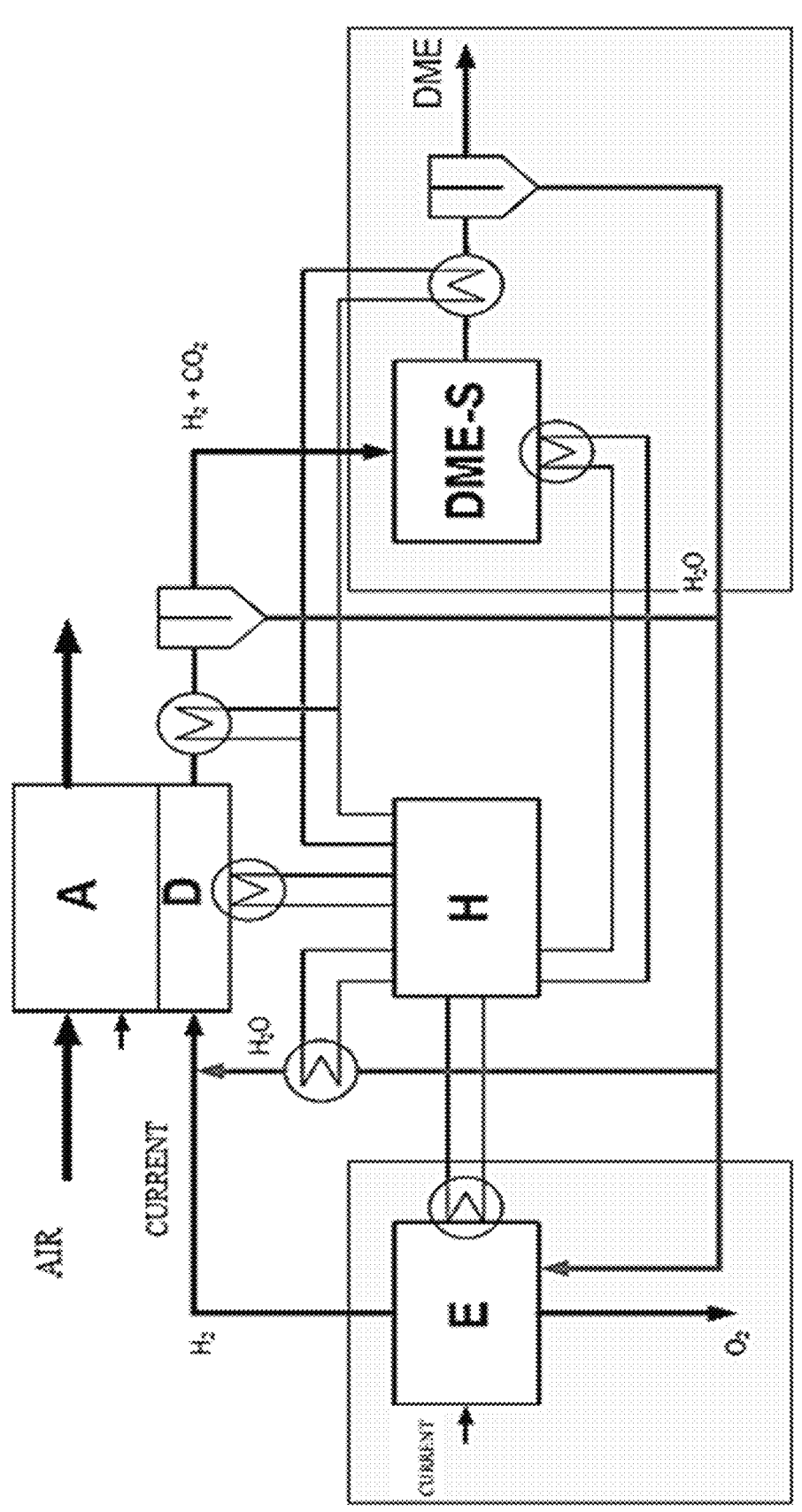
FIG. 3 shows a heat integration concept for the method according to the invention.

FIG. 3 shows how the method according to the invention and the device according to the invention, comprising an adsorption zone A and a desorption zone D, can be con-nected to other processes. In particular, in this case, a concept of a method for highly efficient $CO_2$ extraction from air using waste heat from upstream and downstream process steps such as electrolysis E and dimethyl ether synthesis DME-S is presented. The interconnection in terms of energy can take place directly or via a heat distributor H.

Figure 4:
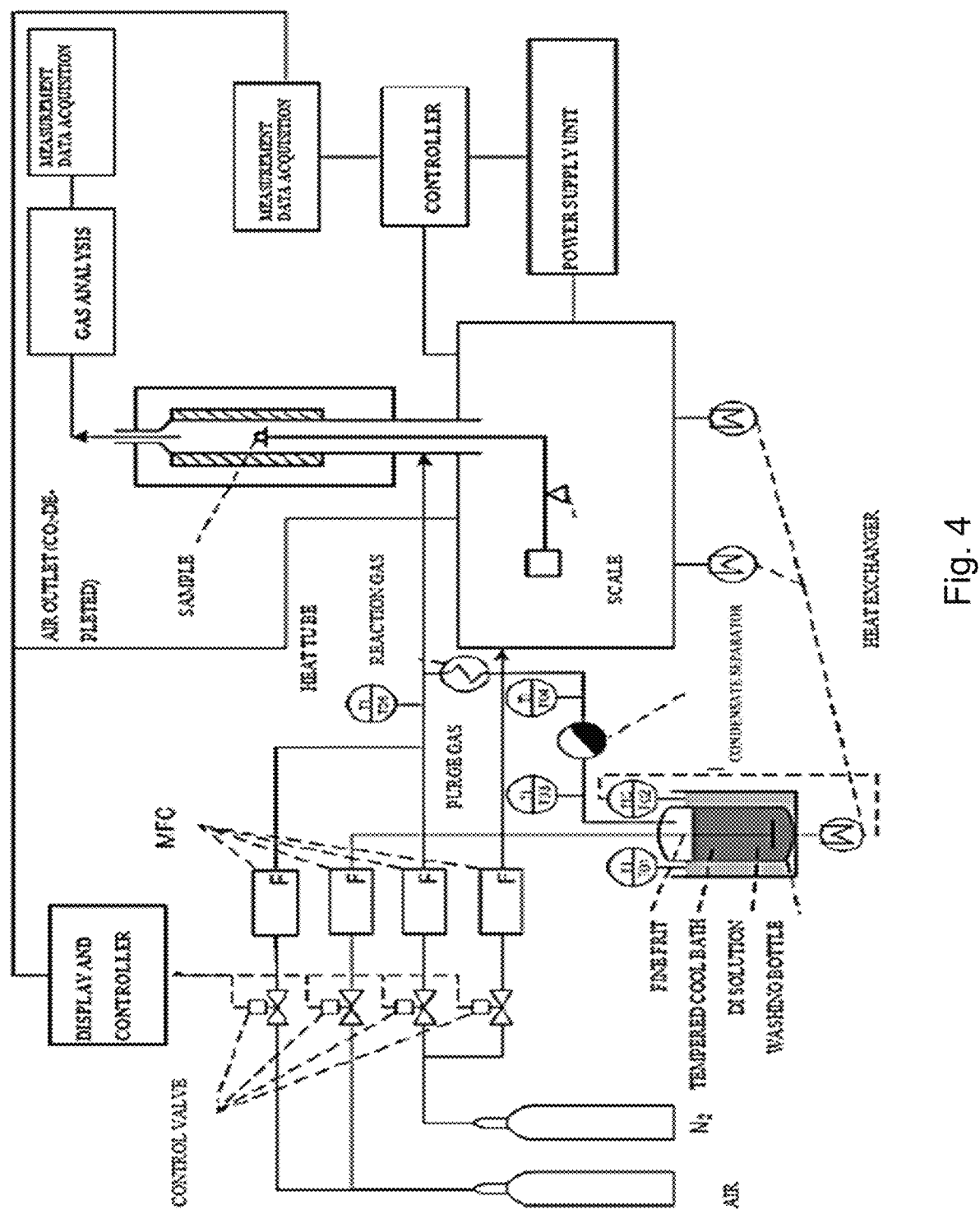
FIG. 4 shows a test stand comprising a thermogravimetric analysis apparatus. This test set was used to determine the $CO_2$ absorption capacity of different carrier materials.

FIG. 4 shows a diagram of a test stand, with the help of which the $CO_2$ absorption capacity of a plurality of carrier materials charged with different sorbents was measured and compared. Based on the measurements, it was possible to assess whether the corresponding carrier materials are suit-able for implementing a method for extracting $CO_2$. The ion exchange resin Lewatit® VP OC 1065 (provided by Merck), which is known to be able to be used as a $CO_2$ sorbent, served as the reference material.

The test stand includes a thermogravimetric analysis (TGA) and a downstream gas analysis. The TGA comprises a test sample room P and a scale room W. In the test sample room P, the temperature and the gas atmosphere can be varied. The sensitive scale is located in the scale room W, which is connected to the test sample room P on the gas side. For this reason, the scale room was subjected to a constant, low flow of nitrogen gas, which was considered in the gas analysis. Dry nitrogen and dry and humid air were used as reaction gases. Humidification was carried out by means of $H_2O$ saturation at 13° C. and subsequent gas heating corresponding to a relative humidity of approx. 50%. The exhaust gases from the test sample room were guided to a gas analyzer. The measurement data was recorded with "LabVIEW" with a time resolution of two seconds. The TGA data were evaluated using the NETZSCH *Proteus®* software.

Experiments

Experiments Relative to Adsorption Capacity

Tests on the adsorption capacity of various solid-bound sorbents were carried out. In all tests, a sample mass of approx. 20-50 mg (carrier material with sorbent) was first weighed in and a TGA program was started. In general, two adsorption and three desorption cycles were carried out in all experiments.

Figure 5:
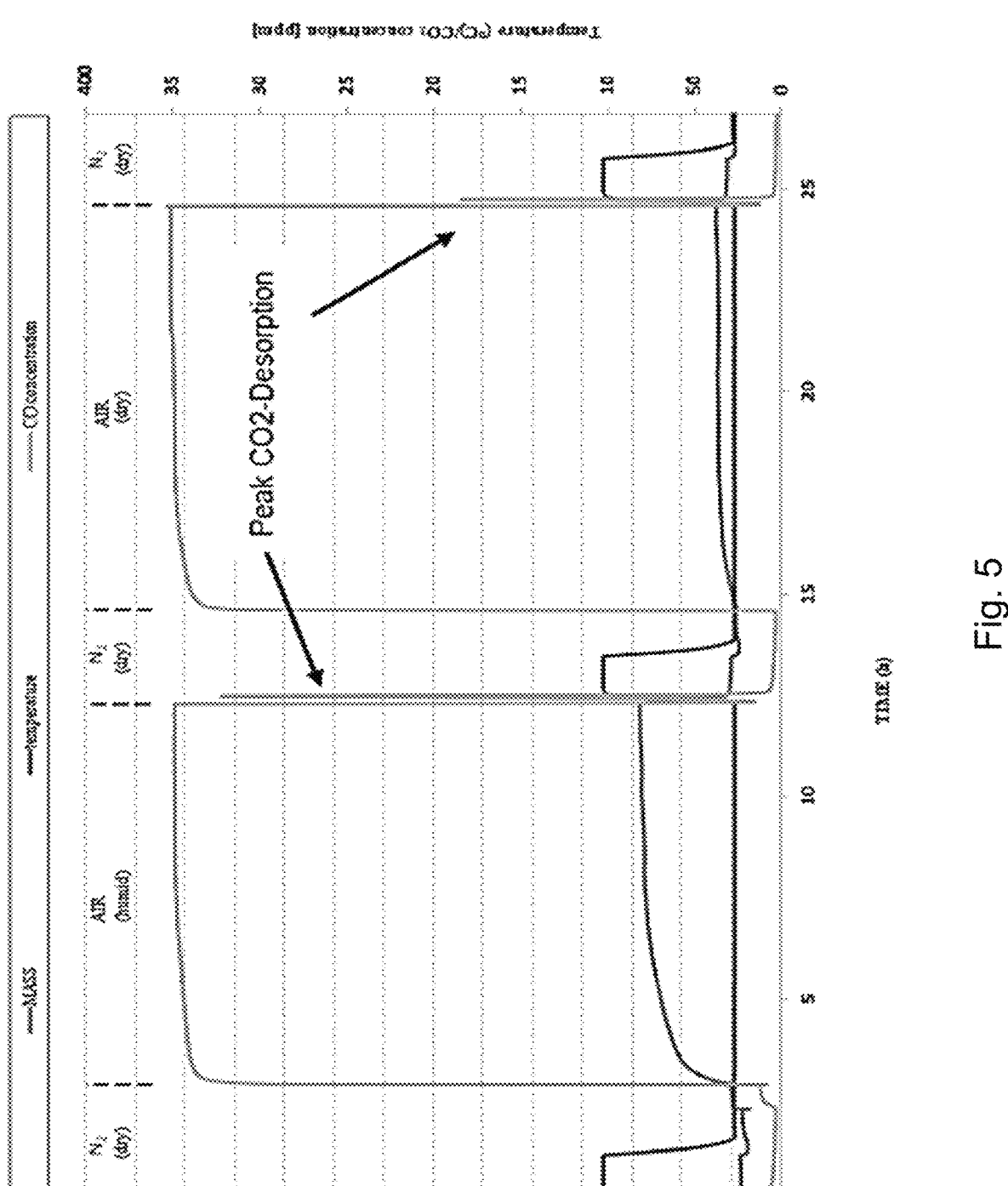
FIG. 5 shows the results of the TGA analysis of a carrier material examined during development.

FIG. 5 shows the evaluation of an exemplary TGA examination on a sample with determination of the absorption and desorption capacity of the material. As described, the analysis begins with the heating of the sample in an $N_2$ atmosphere for the complete desorption of $CO_2$ and $H_2O$. The temperature is then kept at 110° C. for 30 minutes and the sample is cooled down to 25° C. again. After complete desorption, the 1st adsorption cycle with humid air begins. For this purpose, synthetic, dry air is saturated in a water bath at 13° C. and then heated to 25° C., which corresponds to a relative humidity of approx. 50%. In the adsorption phase, the sample is slowly charged with $CO_2$ and $H_2O$, which can be clearly seen from the increase in mass of the sample in the diagram. An integral determination of the adsorbed amount of $CO_2$ is not possible in the adsorption cycle, because the $CO_2$ concentration of the humid air supply changes only slightly over the duration of the adsorption cycle (10 h). The $CO_2$ quantity is therefore determined in the subsequent desorption cycle, during which a sharp $CO_2$ peak can be measured. The water absorption can be determined from the mass increase (TGA) during adsorption minus the $CO_2$ mass (during desorption).

The invention claimed is:

1. A method for continuously obtaining carbon dioxide from a carbon-dioxide containing atmosphere, the method comprising the steps of guiding a fibrous carrier material charged with polyethylene imine alternately through at least one adsorption zone (A) and at least one desorption zone (D), wherein the at least one desorption zone (D) is heated at least in portions to a temperature of more than 30° C., wherein the carrier material adsorbs carbon dioxide from the carbon-dioxide containing atmosphere at room temperature and normal pressure in the at least one adsorption zone (A), and emits the same in the at least one desorption zone (D) at a temperature which is higher than room temperature and/or at a lower carbon dioxide partial pressure than normal conditions.

2. The method of claim 1, wherein the at least one desorption zone (D) is heated at least in portions to a temperature more than 70° C.

3. The method of claim 1, wherein the reduced lower carbon dioxide partial pressure in the at least one desorption zone (D) is achieved through (i) reducing the absolute pressure to a maximum of 700 mbar, (ii) supplying a stripping gas, or (iii) a combination of (i) and (ii).

4. The method of claim 1, wherein the reduced lower carbon dioxide partial pressure in the at least one desorption zone (D) is achieved through (i) reducing the absolute pressure to 90 to 250 mbar, (ii) supplying a stripping gas, or (iii) a combination of (i) and (ii).

5. The method of claim 1, wherein the at least one desorption zone (D) comprises several portions at different temperatures (T, T', T").

6. The method of claim 5, wherein a first portion is at room temperature and has an absolute pressure of 90 to 250 mbar.

7. The method of claim 6, wherein another portion is heated to a temperature of 90 to 110° C. and has an absolute pressure of 90 to 150 mbar.

8. The method of claim 1 wherein the carbon dioxide-containing atmosphere is air, which is continuously guided into the adsorption zone (A).

9. The method of claim 8, wherein the carbon dioxide-containing atmosphere is continuously guided into the adsorption zone (A) exclusively by natural convection of the surrounding air.

10. The method of claim 1, wherein the carbon-dioxide containing atmosphere is air which has a relative humidity of at least 20%, so that the carrier material in the at least one adsorption zone (A) also absorbs water from the carbon-dioxide containing atmosphere in addition to carbon dioxide.

11. The method of claim 10, wherein the carrier material releases not only carbon dioxide but also water in the at least one desorption zone (D), wherein the at least one desorption zone (D) comprises at least three portions with different temperatures (T, T', T").

12. The method of claim 11, wherein a first portion is at room temperature (T) and has an absolute pressure (p) of 90 to 250 mbar, and a second portion is heated to a temperature (T') of 45 to 85° C. and has an absolute pressure (p') of 90 mbar to 250 mbar, and a last portion is heated to a temperature (T") of 95 to 110° C. and has an absolute pressure (p") of 90 mbar to 150 mbar.

13. The method of claim 1 further comprising synthesizing a hydrocarbon from the adsorbed carbon dioxide.

14. A device for obtaining carbon dioxide from a carbon-dioxide containing atmosphere, comprising a fibrous carrier material charged with polyethylene imine, an adsorption zone (A) and a desorption zone (D), wherein the desorption zone (D) has at least two spatially separate gas outlets, which are each connected to a respective suction device, wherein the desorption zone (D) comprises at least one heating device and/or at least one device for pressure reduction and/or a stripping gas feed, and wherein the fibrous carrier material charged with polyethylene imine is movably tensioned over a number of support and/or deflection rollers, which are arranged in the adsorption zone (A) and/or in the desorption zone (D).

15. The device of claim 14, wherein the adsorption zone (A) is a thermodynamically open system, which allows free heat and material exchange with the environment.

16. The device of claim 14, wherein the fibrous carrier material is a non-woven fabric or a woven fabric.

17. The device of claim 14, wherein the fibrous carrier material adsorbs 70 to 700 mg of carbon dioxide per 1 g of polyethylene imine.

18. The device of claim 14, wherein the polyethylene imine is a branched polyethylene imine and has a number-average molecular weight Mn of 25,000 to 100,000 g/mol.

19. A method for continuously obtaining carbon dioxide from a carbon-dioxide containing atmosphere, the method comprising the steps of guiding a fibrous carrier material charged with polyethylene imine alternately through at least one adsorption zone (A) and at least one desorption zone (D), wherein the at least one desorption zone (D) comprises several portions at different temperatures (T, T', T"), wherein the carrier material adsorbs carbon dioxide from the carbon-dioxide containing atmosphere at room temperature and normal pressure in the at least one adsorption zone (A), and emits the same in the at least one desorption zone (D) at a temperature which is higher than room temperature and/or at a lower carbon dioxide partial pressure than normal conditions.

\* \* \* \* \*